United States Patent Office 3,021,327
Patented Feb. 13, 1962

3,021,327
14-DEHYDRO AND 15-DEHYDRO-11-OXY-GENATED PROGESTERONES
Philip F. Beal III, Kalamazoo, and Robert W. Jackson, Kalamazoo Township, Kalamazoo County, Mich., assignors to The Upjohn Company, Kalamazoo, Mich., a corporation of Delaware
No Drawing. Filed July 20, 1961, Ser. No. 125,386
21 Claims. (Cl. 260—239.55)

This invention relates to novel 14-dehydro and 15-dehydro-11-oxygenated-progesterones, the 15-methyl derivatives thereof and the corresponding 3,20-bis(alkylene ketals) of all of these compounds. It is particularly concerned with 11($\alpha$ and $\beta$)-hydroxy-4,14-pregnadiene-3,20- diones and the corresponding 11-keto analogues, 15-methyl-11($\alpha$ and $\beta$)-hydroxy-4,14-pregnadiene-3,20-diones and the 11-keto counterparts thereof, 11($\alpha$ and $\beta$)-hydroxy-4,15-pregnadiene-3,20-diones and the corresponding 11-keto analogues, 15-methyl-11($\alpha$ and $\beta$)-hydroxy-4,15-pregnadiene-3,20-diones, 15-methyl-4,15-pregnadiene-3,11,20-trione, and the corresponding 3,20-bis(alkylene ketals) of all of these compounds, and processes for preparing same. The novel compounds of this invention also include 15-methylene-11($\alpha$ and $\beta$)-hydroxy and ketoprogesterones, the 3,20-bis(alkylene ketals) thereof and processes therefor.

The compounds of this invention and a process of production thereof are illustratively represented by the following sequence of formulae:

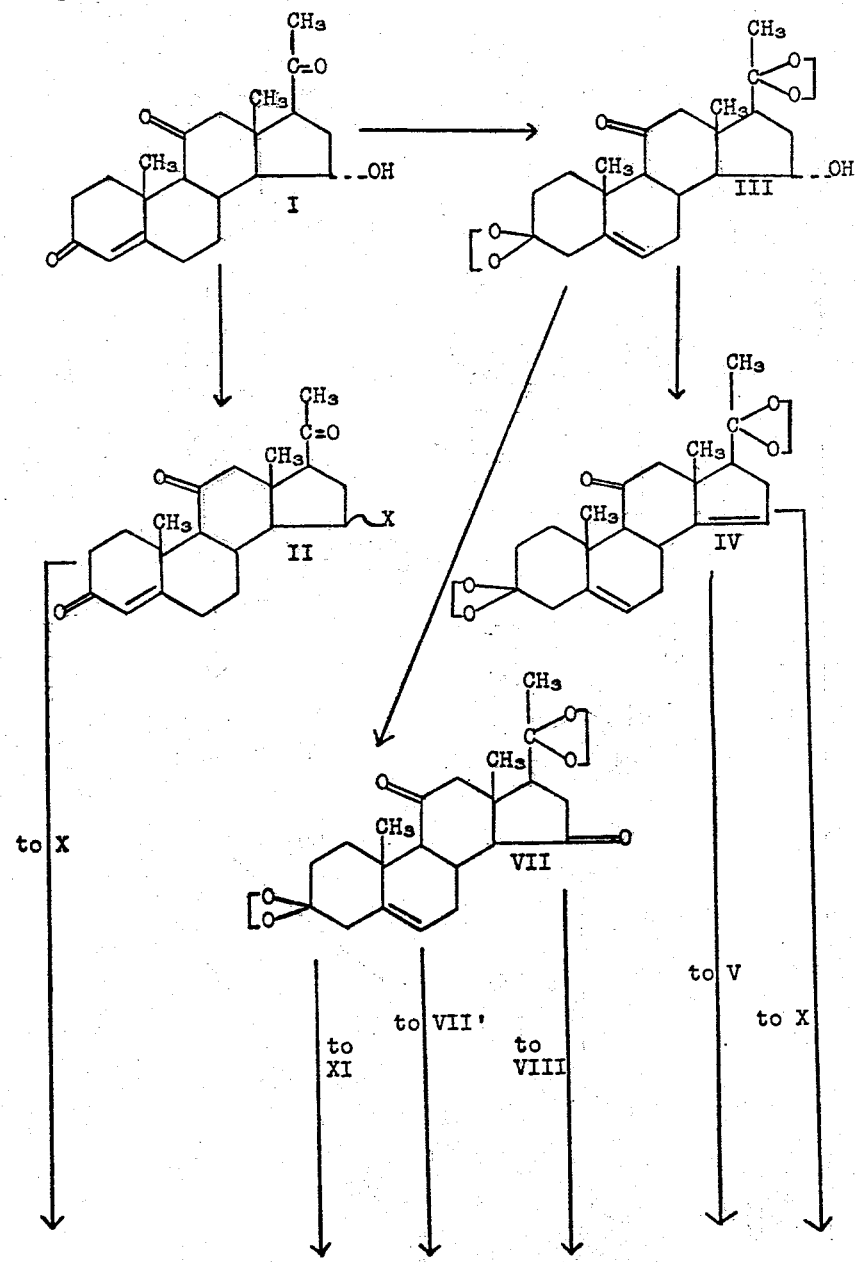

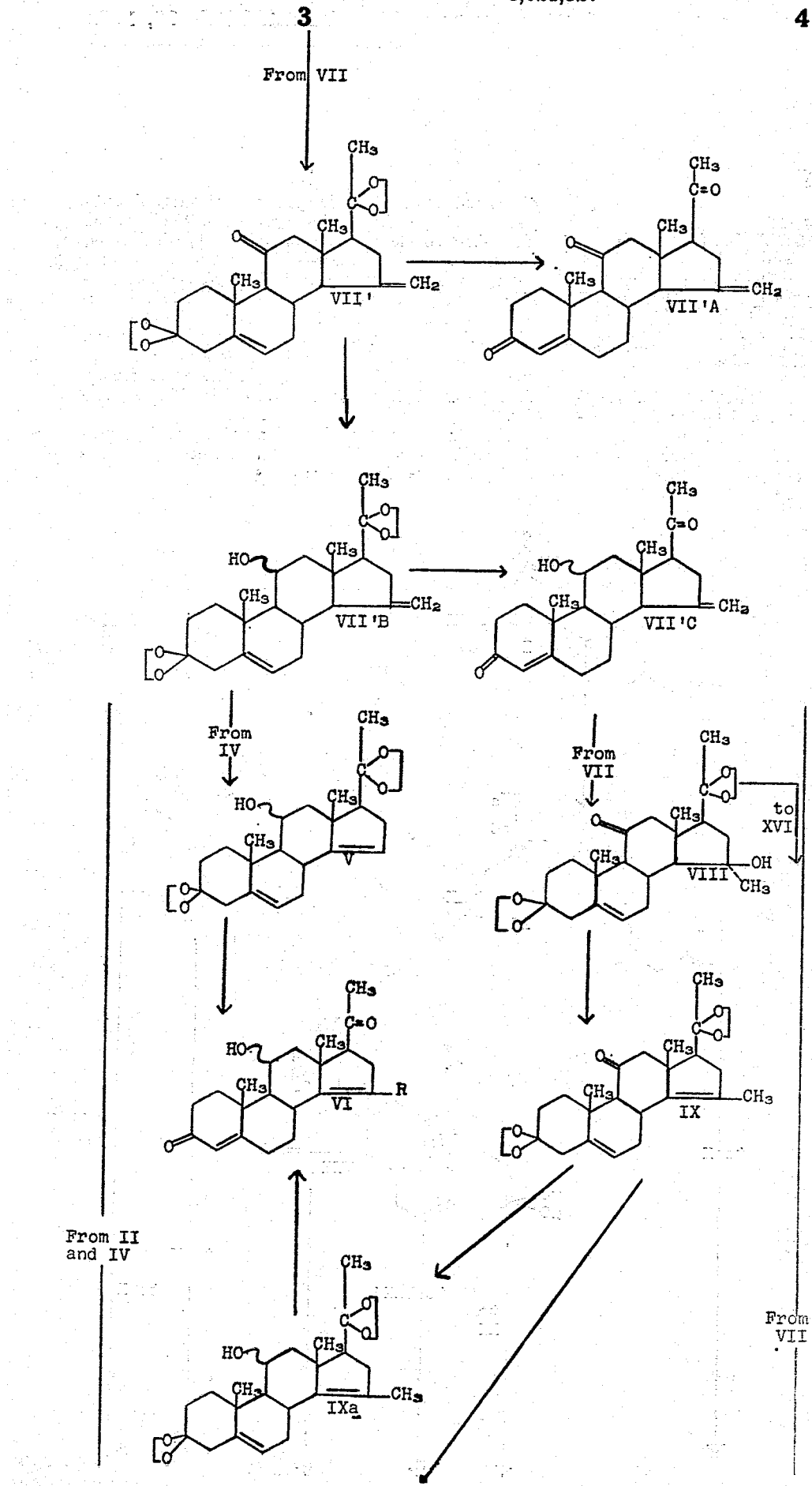

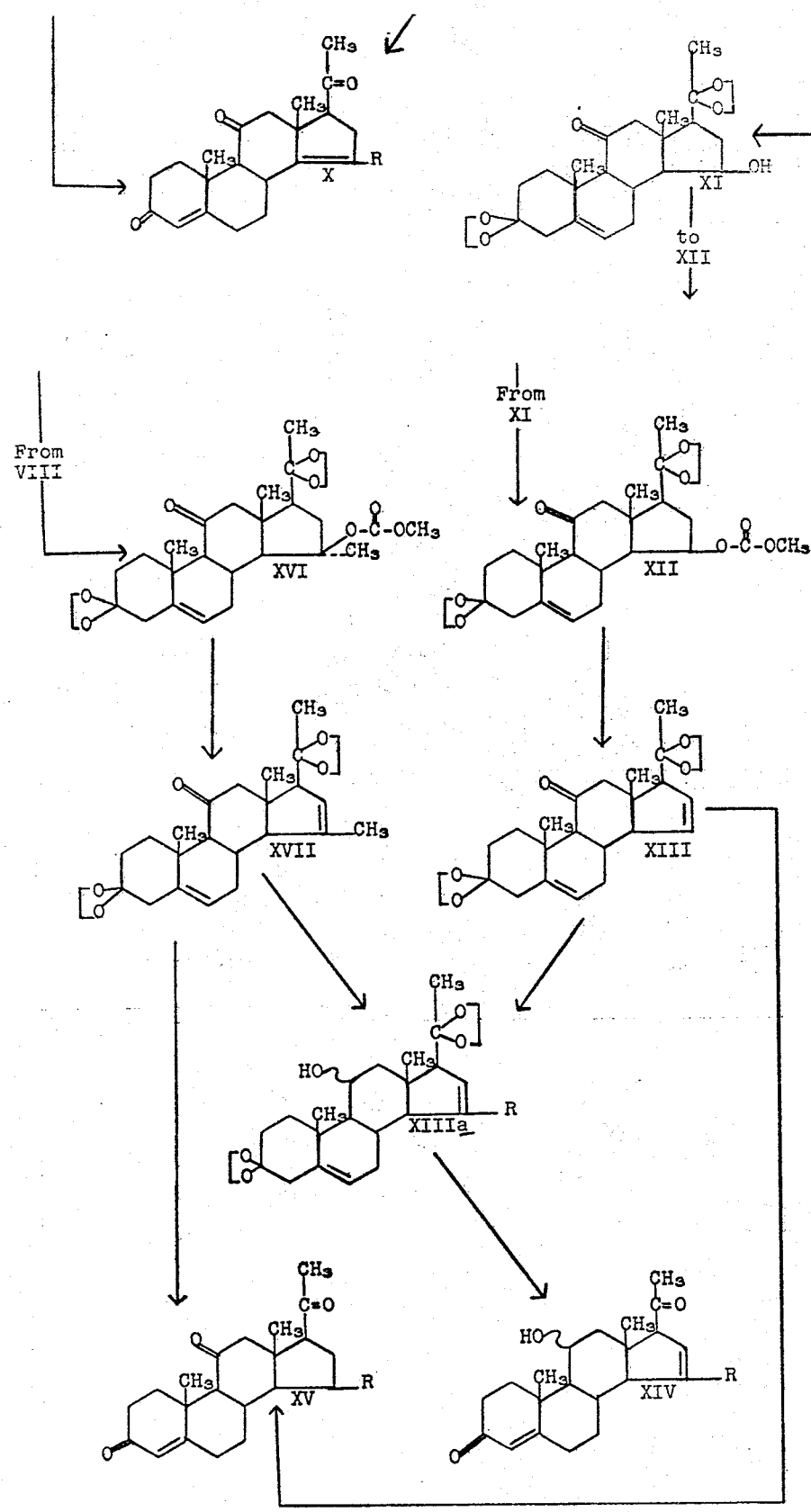

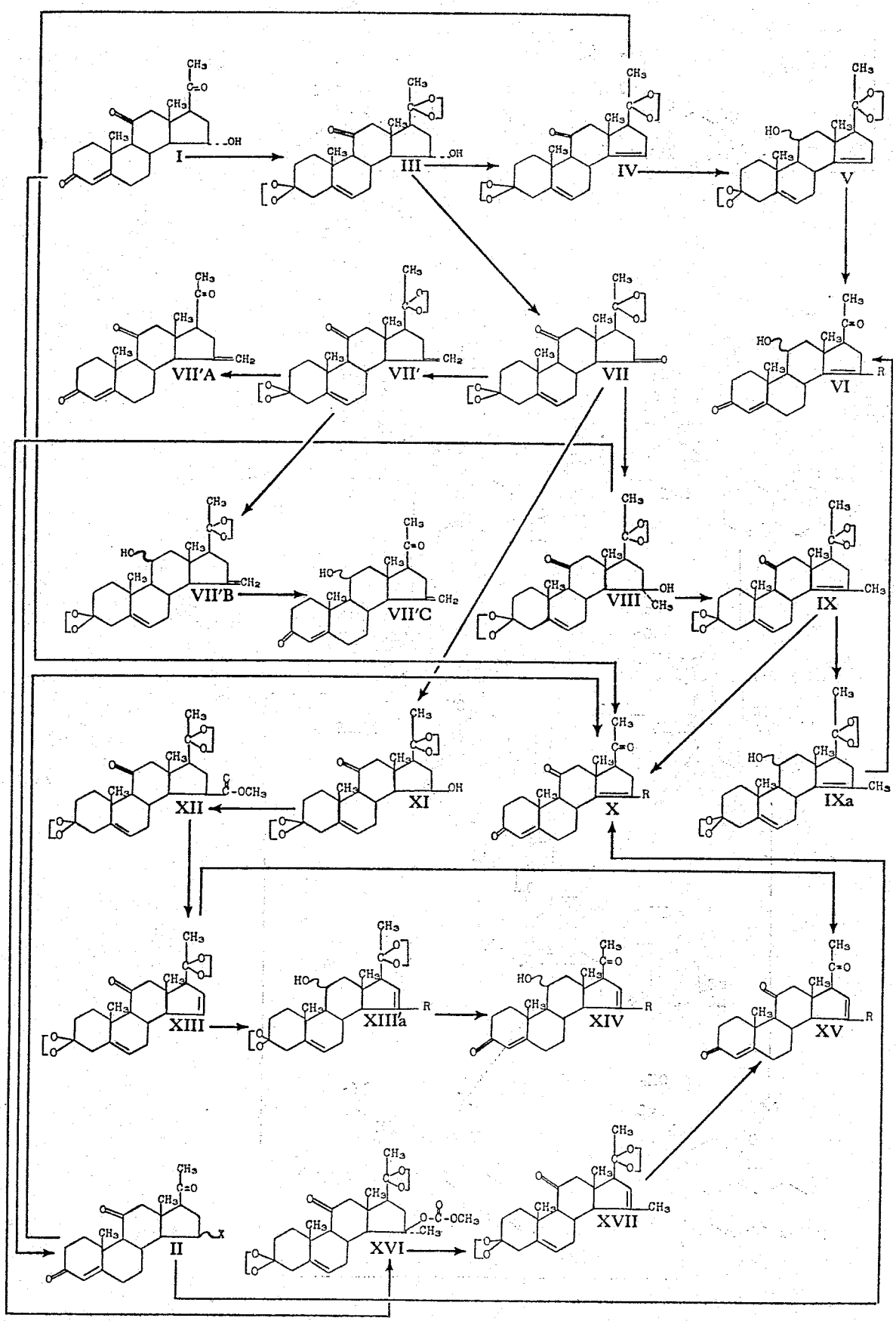

wherein X is selected from the group consisting of chlorine and bromine; R is selected from the group consisting of hydrogen and methyl; ~ is a generic expression denoting α and β-bonds and mixtures thereof; the symbol

represents an alkylene ketal radical of the formula

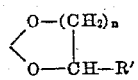

wherein $n$ is selected from the integers one and two and R' is selected from the group consisting of hydrogen and a lower-alkyl radical containing from one to six carbon atoms, inclusive.

The novel compounds of this invention possess valuable pharmacological properties such as tranquilizing, central nervous system depressing, analgetic, sedative, salt regulating and anti-inflammatory activities and consequently are useful in the treatment of nervous disorders, hypertension, congestive heart failure, allergic reactions, rheumatoid arthritis and related illnesses in both humans and valuable domestic animals. These compounds can be prepared and administered to mammals, birds, humans and animals in a wide variety of oral and parenteral dosage forms, singly, or inadmixture with other coacting compounds. They can be associated with a carrier which can be a solid material or a liquid in which the compound is dissolved, dispersed or suspended. The solid compositions can take the form of tablets, powders, capsules, pills or the like, preferably in unit dosage forms for simple administration or precise dosage. The liquid compositions can take the form of solutions, emulsions, suspensions, syrups or elixirs. The novel compounds of this invention which particularly possess the aforementioned valuable pharmacological and therapeutic usefulness have the formulae:

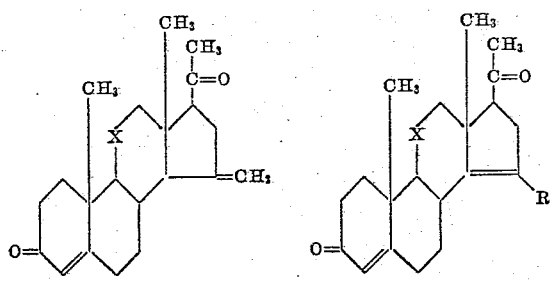

and

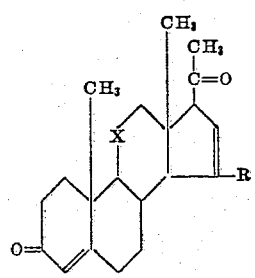

wherein X is selected from the group consisting of the

β-hydroxymethylene radical

the α-hydroxymethylene radical

and the carbonyl radical, $>C=O$, R is selected from the group consisting of hydrogen and methyl, and the 3,20-bis(alkylene ketals) thereof wherein the alkylene ketal radicals are of the formula

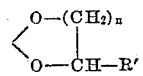

wherein $n$ is selected from the integers one and two and R' is selected from the group consisting of hydrogen and a lower-alkyl radical containing from one to six carbon atoms, inclusive.

Besides the above-noted therapeutic uses of the novel progesterones of this invention, these compounds are additionally valuable in that they can be employed in the production of new and useful further substituted progesterones, cortisones and hydrocortisones and their corresponding 9α-fluoro and 1-dehydro analogues. For example, 14-dehydro-15β-methylprogesterone can be converted to 15β-methylhydrocortisone and 15β-methylcortisone and their corresponding 1-dehydro and 9α-halo analogues; the 15-dehydro counterparts can be utilized in the preparation of 15α-methylhydrocortisone and 15α-methylcortisone and their corresponding 1-dehydro and 9α-halo analogues.

The novel compounds of the present invention are prepared from 15α-hydroxy-4-pregnene-3,11,20-trione (I) by the following reactions: The triketo compound (I) is converted to a corresponding 3,20-bisketal (III) by the method disclosed in U.S. Patent 2,773,060 using the ketal forming agents disclosed therein, i.e., an alkane-1,2-diol or alkane-1,3-diol such as, ethylene glycol, propane-1,2-diol, propane-1,3-diol, butane-1,2-diol, pentane-1,2-diol, 3-methylpentane-1,2-diol, hexane-1,3-diol, octane-1,2-diol and the like. The ketal groups at the 3 and 20-positions are thus each of the following general formula:

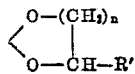

wherein R' is a member of the group consisting of hydrogen and a lower-alkyl group and $n$ is an integer from one to two, inclusive. Ethylene glycol is the preferred diketalizing agent.

The next step of the process of this invention for the preparation of the 14-dehydro compounds of Formulae VI and X, wherein R is hydrogen, involves dehydrating a 15α-hydroxy - 4 - pregnene-3,11,20-trione 3,20-bis(alkylene ketal) (III) e.g., by preparing a mixture of the 15α-tosylate and 15β-chloro derivatives with p-toluenesulfonyl chloride and pyridine and treating with collidine to produce a 4,14-pregnadiene-3,11,20-trione 3,20-bis(alkylene ketal) (IV). Reducing the thus obtained 14-dehydro compound (IV) e.g., with lithium aluminum hydride in an organic solvent inert to the reaction such as tetrahydrofuran, yields an 11β-hydroxy-4,12-pregnadiene-3,20-dione 3,20-bis(alkylene ketal) (V) while reduction with sodium in alcohol yields an 11α-hydroxy-4,14-pregnadiene-3,20-dione 3,20-bis(alkylene ketal) (V). Hydrolysis of the 3,20-diketal substituents of the thus obtained 11-hydroxy compounds (V) can be carried out employing conventional hydrolytic methods, e.g., under very mild conditions such as using dilute aqueous acid at room temperature, to give 11(α and β)-hydroxy-4,14-pregnadiene-3,20-diones (VI). The 11α-hydroxy compounds of Formula VI can be converted to the corresponding 11β-hydroxy counterparts by oxidation, e.g., with chromium trioxide in acetic acid or acetone, to produce the corresponding 11-keto compound (X), which is then diketalized to yield a 4,14-pregnadiene-3,11,20-trione 3,20-bis(alkylene ketal) (IV); reaction of the thus obtained product (IV) with lithium aluminum hydride in an inert solvent followed by ketal hydrolysis yields 11β-hydroxy-4,14-pregnadiene-3,20-dione (VI). The 11-keto compounds represented by Formula IV can be hydrolyzed in the same manner as the 11-hydroxy compounds of Formula V to yield the corresponding 4,14-pregnadiene-3,11,20-trione (X).

The compounds of Formula X can also be obtained by an alternative route comprising: reacting 15α-hydroxy-4-pregnene-3,11,20-trione (I) with a suitable halogenating agent to give the corresponding 15-halo-4-pregnene-3,11,20-trione (II) (the 15-halo derivative produced is chloro when p-toluenesulfonyl chloride and pyridine is employed; use of N-bromoacetamide gives the corresponding 15-bromo derivative); dehydrohalogenating either of the thus obtained 15-halo compounds (II), e.g., by heating at refluxing temperatures with a tertiary aromatic amine such as pyridine, collidine and lutidine, yields 4,14-pregnadiene-3,11,20-trione (X).

In the preparation of the 14-dehydro compounds of Formulae VI and X wherein R is methyl, the starting material employed is a 15α-methyl-15β-hydroxy-3,11,20-trione 3,20-bis(alkylene ketal) (VIII). The production of such a compound (VIII) can be carried out by diketalizing the compound of Formula I to form a compound of Formula III, in the manner indicated above; oxidizing the thus produced compound (III), e.g., with chromium trioxide, to obtain a 4-pregnene-3,11,15,20-tetraone 3,20-bis(alkylene ketal) (VII) and reacting this product (VII) with a methyl Grignard reagent, preferably methyl magnesium bromide or iodide, suspended in a suitable solvent such as tetrahydrofuran, to yield a 15α-methyl-15β-hydroxy-3,11,20-trione 3,20-bis(alkylene ketal) (VIII). Dehydration of the compound of Formula VIII, e.g., with thionyl chloride, produces a 15-methyl-4,14-pregnadiene-3,11,20-trione 3,20-bis(alkylene ketal) (IX). Reducing the thus obtained 15-methyl compound (IX) in the same manner as disclosed above for the corresponding 15-hydrogen counterpart (IV) yields a 15-methyl-11(α and β)-hydroxy-4,14-pregnadiene-3,20-dione 3,20-bis(alkylene ketal) (IXa). Hydrolysis of a 15-methyl compound of Formula IXa in the same manner as described above for the corresponding 15-hydrogen counterpart (V), yields a 15-methyl compound of Formula VI. Likewise, 15-methyl-11α-hydroxy-4,14-pregnadiene-3,20-dione (VI) can be converted to the corresponding 11β-epimer by the same procedures described above for the 15-hydrogen counterparts. By following the procedure indicated above for the hydrolysis of a 15-hydrogen, 3,20-bisketal (IV) in the production of the corresponding 3,20-diketo compound (X), the 15-methyl counterpart (IX) can be converted to the 15-methyl-3,20-diketone (X).

In preparing the 15-dehydro compounds of Formulae XIV and XV, wherein R is hydrogen, the starting material employed is a 15β-hydroxy-11-ketoprogesterone 3,20-bis(alkylene ketal) (XI). The production of such a compound (XI) can be carried out by reducing the 15-keto group of a compound of Formula VII (prepared as described above), e.g., with a metal borohydride such as sodium borohydride suspended in a suitable solvent. The reaction of the 15β-hydroxy-11-ketoprogesterone 3,20-dione 3,20-bis(alkylene ketal) (XI) with dimethyl carbonate and an alkali-metal hydride yields a 15β-hydroxy - 4 - pregnene-3,11, 20-trione 3,20-bis(alkylene ketal), 15-methyl carbonate (XII). Loss of COO and $CH_3OH$ from the compound of Formula XII occurs at the 15-position on heating, preferably under vacuum, to yield a 4,15-pregnadiene-3,11,20-trione 3,20-bis(alkylene ketal) (XIII). The thus produced compound (XIII) is reduced to an 11(α and β)-hydroxy-4,15-pregnadiene-3,20-dione 3,20-bis(alkylene ketal) (XIIIa) in the same manner as disclosed for reducing an 11-keto-4,14-pregnadiene (IV) to yield a compound of Formula V, above. Hydrolysis of the 15-dehydro-3,20-diketals of the 11-hydroxy compounds (XIIIa) to produce their corresponding 3,20-diketones (XIV), can be carried out in the manner shown above for the conversion of the 14-dehydro-3,20-diketals (V) to their corresponding 3,20-diketones (VI). The 11α-hydroxy compounds of Formula XIV can be converted to their corresponding 11β-hydroxy counterparts in the same manner as for the 14-dehydro compounds of Formula VI disclosed above. In the same manner as disclosed above for the hydrolysis of the 3,20-diketals of the 14-dehydro compound (IV) to form the corresponding 3,11,20-triketone (X), the 15-dehydro 3,20-diketals of Formula XIII are converted to their corresponding 3,11,20-triones (XV).

The 15-dehydro compounds of Formulae XIV and XV, wherein R is methyl, are prepared from a 15α-methyl - 15 - hydroxy - 4 - pregnene - 3,11,20 - trione 3,20-bis(alkylene ketal), 15-methyl carbonate ester (XVI). A 15α-methyl-15β-hydroxy-4-pregnene-3,11,20-trione, 3,20-bis(alkylene ketal) (VIII) (prepared as disclosed above) is reacted with dimethyl carbonate and an alkali-metal hydride to produce a compound of Formula XVI. Pyrolysis of the carbonate ester of the thus produced compound (XVI) yields a 15-methyl-4,15-pregnadiene - 3,11,20-trione 3,20 - bis(alkylene ketal) (XVII). A compound of Formula XVII is reduced to an 11(α and β)-hydroxy-4,15-pregnadiene-3,20-dione 3,20-bis(alkylene ketal) (XIIIa) in the same manner as disclosed above for the reduction of an 11-keto-4,14-pregnadiene (IV) to yield the corresponding 11-hydroxy compound (V). Hydrolysis of the 15-methyl-15-dehydro 3,20-diketals of the 11-hydroxy compounds (XIIIa) to produce their corresponding 3,20-diketones (XIV), can be carried out in the manner shown above for the conversion of the 15-hydrogen-14-dehydro 3,20-bisketals (V) to their corresponding 3,20-diketones (VI). The 15-methyl-11α-hydroxy compounds of Formula XIV can be converted to their corresponding 11β-epimers in the same manner as shown above for the 15-hydrogen-14-dehydro compounds (VI). Following the procedure disclosed above for the hydrolysis of the 3,20-diketals of the 15-hydrogen-14-dehydro compounds (IV) to form the corresponding 3,11,20-triones (X), but substituting a 15-methyl-4,15-pregnadiene-3,11,20-trione, 3,20-bis(alkylene ketal) (XVII) as starting material, yields the corresponding 15-methyl-4,15-pregnadiene-3,11,20-trione (XV).

In the preparation of the 15-methylene compounds of Formulae VII′, VII′A, VII′B and VII′C, the starting material is a 4-pregnene-3,11,15,20-tetraone, 3,20-bis(alkylene ketal) (VII), obtained as disclosed above in one of the steps of the process for synthesizing the 14-dehydro-15-methyl compounds of this invention. The transformation of the 15-keto compound (VII) to the corresponding 15-methylene-3,11,20-trione-3,20-bis(alkylene ketal) (VII') is carried out along the general lines of the method of Wittig (see Ber. 87, 1318 [1954], and 88, 1654 [1955]), for conversion of a carbonyl compounds into an olefin in which the oxygen atom is replaced by an alkylidene group by the action of an alkylidene triphenylphosphorane. Thus, the reaction of a 4-pregnene-3,11,15,20-tetraone 3,20-bis(alkylene ketal) (VII) with an alkyl triphenylphosphonium halide and alkyl lithium (or with a trialkylphosphonate and sodium hydride) yields a 15-methylene-3,11,20-trione-3,20-bis(alkylene ketal) (VII').

Reduction of the thus obtained 15-methylene compound (VII') e.g., with lithium aluminum hydride in an organic solvent such as tetrahydrofuran and with sodium in a solvent such as ethanol yields a 15-methylene-11($\beta$ and $\alpha$)-hydroxy-4-pregnene-3,20-dione 3,20-bis(alkylene ketal) respectively (VII'B). Hydrolysis of the 3,20-diketal substituents of the thus obtained 11-hydroxy compounds (VII'B) can be carried out employing conventional methods, e.g., using dilute aqueous acid under mild conditions such as room temperature, to give 15-methylene-11($\alpha$ and $\beta$)-hydroxy-4-pregnene-3,20-dione (VII'C). The 11$\alpha$-hydroxy compounds of Formula VII'C can be converted to the corresponding 11$\beta$-hydroxy counterparts by oxidation, e.g., with chromium trioxide in acetic acid or acetone, to produce the corresponding 11-keto compound (VII'A) which is then diketalized to yield a 15-methylene-4-pregnene-3,11,20-trione 3,20-bis(alkylene ketal) (VII'); reaction of the thus obtained product (VII') with lithium aluminum hydride in an inert solvent yields 15-methylene-11$\beta$-hydroxy-4-pregnene-3,20-dione (VII'C). The 11-keto compounds represented by Formula VII' can be hydrolyzed in the same manner as the 11-hydroxy compounds of Formula VII'B to yield the corresponding 15-methylele-4-pregnene-3,11,20-trione (VII'A).

The 14 and 15-dehydro and 15-methylene compounds of this invention produced by the above-described methods can be isolated from their reaction mixtures by conventional methods, for example, by pouring the reaction mixture into water and separating the resultant precipitate by filtration. Additional purification of the product can be accomplished by conventional methods, for example, by recrystallization from a suitable solvent or mixture of solvents, e.g., by gradient elution chromatography from an adsorbent column with a suitable mixture of solvents, such as, methylene chloride-Skellysolve B (hexanes), acetone-Skellysolve B, and the like.

PREPARATION 1

*15$\alpha$ - hydroxy - 11 - ketoprogesterone (15$\alpha$ - hydroxy - 4-pregnene-3,11,20-trione) (I)*

A medium was prepared of ten grams of Cerelose (dextrose) 20 grams of corn steep liquor and 1000 milliliters of water and adjusted to a pH between 5.5 and 6. Twelve liters of this sterilized medium was inoculated with spores of Penicillium urticae ATCC 10120 and incubated for a period of 24 hours at a temperature of 26 degrees centigrade, using a rate of aeration and stirring such that the oxygen up-take was 13 millimoles per hour per liter of sodium thiosulfate, according to the method of Cooper, Fernstrom and Miller, Ind. Eng. Chem. 36, 504 (1944). To this medium containing a 24 hour growth of Penicillium urticae was added 2 grams of 11-ketoprogesterone, dissolved in 100 milliliters of acetone. After an additional 24 hour period of incubation under the same conditions of temperature and aeration, the beer and mycelium were separated. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts, including solvent, were added to the beer filtrate and the combined extracts and beer filtrates were extracted successively with two one-half by volume portions of methylene chloride and then with two one fourth by volume portions of methylene chloride. The methylene chloride extracts were washed with two one-tenth by volume portions of a 2% aqueous solution of sodium bicarbonate and then with two one-tenth by volume portions of water. After drying the methylene chloride extracts with about 3 to 5 grams of anhydrous sodium sulfate per liter of solvent and filtering, the solvent was distilled from the filtrate. The residue thus obtained was recrystallized two times from acetone and ether in 1 to 1 ratio and one time from acetone and Skellysolve B to give 15$\alpha$-hydroxy-11-keto-progesterone (I) of melting point 227 to 229° (in EtOH).

PREPARATION 2

*15$\alpha$ - hydroxy - 4 - pregnene - 3,11,20 - trione 3,20-bis(ethylene ketal) (15$\alpha$-hydroxy-11-ketoprogesterone 3,20-bis[ethylene ketal]) (III)*

A mixture of 4.75 grams of 15$\alpha$-hydroxy-11-ketoprogesterone (I) (Preparation 1), 100 milliliters of benzene, 5 milliliters of ethylene glycol and 0.1 gram of paratoluenesulfonic acid was refluxed with stirring under a water trap for six hours. The mixture was then cooled and the product crystallized. The acid was neutralized by the addition of 10 milliliters of saturated sodium bicarbonate solution and the mixture stirred for fifteen minutes. The crystalline precipitate was removed by filtration and oven-dried. The product was recrystallized from acetone containing a drop of pyridine, to yield 2 grams of crystals melting at 248 to 250°. A second crop furnished 0.80 gram. The original filtrate was evaporated, the residue and also the second crop were recrystallized to yield an additional 1.12 grams of 15$\alpha$-hydroxy-4-pregnene-3,11,20-trione 3,20-bis(ethylene ketal) (III), melting at 246–248 degrees centigrade.

*Analysis.*—Calcd. for $C_{25}H_{36}O_6$: C, 69.42; H, 8.59. Found: C, 69.41; H, 8.42. $[\alpha]_D + 62°$ (acetone);

$\gamma_{max}^{Nujol}$ 3530, 1697, 1100 cm.$^{-1}$

PREPARATION 3

*4-pregnene-3,11,15,20-tetraone 3,20-bis-(ethylene ketal) (11,15 - diketoprogesterone 3,20-bis[ethylene ketal]) (VII)*

A solution of 5.0 grams of 15$\alpha$-hydroxy-11-ketoprogesterone 3,20-bis(ethylene ketal) (III) (Preparation 2) in 50 milliliters of pyridine was added to a solution of 5.0 grams of chromium trioxide in 50 milliliters of pyridine. The reaction mixture was allowed to stand overnight. The mixture was diluted with 300 milliliters of water and extracted with methylene chloride. The solvent was removed in vacuo and the product recrystallized from a mixture of acetone and Skellysolve B (hexanes) to give 2.6 grams of 4-pregnene-3,11,15,20-tetraone-3,20-bis (ethylene ketal) of melting point 198–206°. A sample was twice more recrystallized to give pure 4-pregnene-3,11,15,20-tetraone 3,20-bis(ethylene ketal) (VII) with melting point 208–210° and rotation $[\alpha]_D$ −16 degrees (acetone).

PREPARATION 4

*15$\beta$-hydroxy-11-ketoprogesterone 3,20-bis(ethylene ketal) (15$\beta$-hydroxy-4-pregnene-3,11,20-trione 3,20-bis[ethylene ketal]) (XI)*

A solution of 11,15-diketoprogesterone, 3,20-bis(ethylene ketal) (VII) (Preparation 3) (12.4 g.) in 200 milliliters of purified tetrahydrofuran was added to one liter of isopropyl alcohol. Thereupon 2.1 grams of sodium borohydride and 20 milliliters of water was added and the mixture stirred at room temperature for 3½ hours. The excess borohydride was destroyed by the addition of a few drops of acetic acid. The mixture was thereupon neutralized by the addition of saturated sodium bicarbonate. The reaction mixture was allowed to evaporate under the hood. The residual material was partitioned between methylene chloride and water, and the organic layer was separated, filtered, and evaporated under reduced pressure to give a residue. This residue was dissolved in hot methanol, filtered, and allowed to crystallize to give 8.8 grams of 15β-hydroxy-11-ketoprogesterone 3,20-bis(ethylene ketal) (XI). A sample which was crystallized twice more from methanol melted at 205 to 208 degrees centigrade.

PREPARATION 5

15α - methyl-15β-hydroxy-4-pregnene-3,11,20-trione 3,20-bis(ethylene ketal) (15α-methyl-15β-hydroxy-11-ketoprogesterone 3,20-bis[ethylene ketal]) (VIII)

A solution was prepared containing 1.15 grams of 4-pregnene - 3,11,15,20 - tetraone 3,20-bis(ethylene ketal) (VII) (Preparation 3) in 50 milliliters of tetrahydrofuran. This solution was cooled in an ice bath and thereto was added 20 milliliters of a commercial three-molar methyl magnesium bromide solution in ether. The ice bath was removed and the reaction stirred at room temperature for five hours. The reaction mixture was then decomposed by the addition of a saturated ammonium chloride solution. The liquid was decanted from the solids and filtered. The solids were washed with methylene chloride. The methylene chloride washings were added to the filtrate and the filtrate was allowed to evaporate yielding 1.07 grams of material which was recrystallized from acetone Skellysolve B hexanes to give 15α-methyl-15β-hydroxy-4-pregnene-3,11,20-trione 3,20-bis(ethylene ketal) (VIII) of melting point 206 to 210 degrees centigrade.

*Analysis.*—Calcd. for $C_{26}H_{38}O_6$: C, 69.93; H, 8.58. Found: C, 69.97; H, 8.86. $[α]_D$ (acetone) +15°;

$γ_{max}^{Nujol}$ 3540, 3400, 1695, 1670, 1163, 1095, 1025 cm.$^{-1}$

EXAMPLE 1

4,14-pregnadiene-3,11,20-trione 3,20-bis(ethylene ketal) (14 - dehydro - 11 - keto-progesterone 3,20-bis[ethylene ketal]) (IV)

A mixture of 4.6 g. of 15α-hydroxy-4-pregnene-3,11,20-trione 3,20-bis(ethylene ketal) (III) (Preparation 2), 4 g. of p-toluenesulfonyl chloride and 25 ml. of pyridine was heated on a steam bath, with stirring, for a period of about five hours. The pyridine was removed under vacuum and 20 ml. of collidine then added to the reaction mixture, which was heated at refluxing temperature for a period of about 20 minutes. The mixture was cooled and 200 ml. of ether added thereto; the solid material was removed by filtration. The solvents were removed from the filtrate by vacuum distillation and the resulting residue dissolved in methylene chloride and chromatographed over a column of 350 g. of Florisil (synthetic magnesium silicate). The product which weighed 2.06 g. was eluted with a mixture of 5% acetone in Skellysolve B (hexane hydrocarbons). The product was recrystallized from methanol to yield 1.15 g. An additional crystallization from methanol yielded an analytical sample of pure, crystalline 4,14-pregnadiene-3,11,20-trione 3,20-bis(ethylene ketal) (IV) with a melting point of 179 to 180° C., and rotation $[α]_D$ of +25 in acetone.

*Analysis.*—Calcd. for $C_{25}H_{34}O_5$: C, 72.43; H, 8.27. Found: C, 72.51; H, 8.24.

$γ_{max}^{Nujol}$ 1706, 1665, 1157, 1090, 1024 cm.$^{-1}$

EXAMPLE 1A 4,14-pregnadiene-3,11,20-trione (14-dehydro-11-ketoprogesterone) (X)

A solution of 1 g. of 4,14-pregnadiene-3,11,20-trione 3,20-bis(ethylene ketal) (IV) in 20 ml. of acetone was diluted with 2.5 ml. of water containing 3 drops of concentrated sulfuric acid. After standing for about 15 hours at room temperature (about 22 to 25° C.) the acidity of the reaction mixture was neutralized with saturated sodium bicarbonate and the solvent removed under vacuum. The residue was partitioned with methylene chloride and water and filtered to remove the undissolved solids. The filtrate was separated and the methylene chloride layer allowed to evaporate. The solids therefrom were recrystallized from methanol to yield the product, light-colored crystals of 4,14-pregnadiene-3,11,20-trione (X).

EXAMPLE 2

11β - hydroxy - 4,14 - pregnadiene - 3,20 - dione 3,20 - bis-(ethylene ketal) (14-dehydro-11β-hydroxy-progesterone 320-bis[ethylene ketal]) (V)

To a solution of 10 g. of lithium aluminum hydride suspended in 800 ml. of ether was added 10 g. of 4,14-pregnadiene-3,11,20-trione 3,20-bis(ethylene ketal) (IV) dissolved in 500 ml. of ether. This mixture was stirred for a period of about 45 minutes at room temperature after which time it was heated at refluxing temperature for about one hour, then cooled and hydrolyzed with water. The precipitate that resulted was extracted repeatedly with ether and the combined ether extracts evaporated after washing with water and drying with anhydrous sodium sulfate. The resulting crystalline residue was 11β-hydroxy-4,14-pregnadiene-3,20-dione 3,20-bis(ethylene ketal) (V).

EXAMPLE 2A

11α - hydroxy-4,14 - pregnadiene - 3,20 - dione 3,20 - bis-(ethylene ketal) (V)

To a solution of 0.5 g. of 4,14-pregnadiene-3,11,20-trione 3,20-bis(ethylene ketal) (IV) in 50 ml. of normal propylalcohol at reflux temperature, is added 5 g. of sodium in small pieces. After a period of about one hour, methanol is added to decompose the remaining unreacted sodium. To the reaction mixture is thereupon added 50 ml. of water and the mixture distilled until the product separates from it. The crude product is removed from the essentially aqueous medium by filtration and is recrystallized from a mixture of chloroform and ethanol to give pure, light-colored crystalline 11α - hydroxy - 4,14 - pregnadiene - 3,20 - dione 3,20-bis(ethylene ketal) (V).

EXAMPLE 3

11β-hydroxy-4,14-pregnadiene-3,20-dione (14-dehydro-11β-hydroxyprogesterone) (VI)

A solution of 0.5 g. of 11β-hydroxy-4,14-pregnadiene-3,20-dione 3,20-bis(ethylene ketal) (V) in 15 ml. of acetone was diluted with 1.5 ml. of water containing 2 drops of concentrated sulfuric acid and allowed to stand at room temperature (about 22 to 25° C.) for a period of approximately 15 hours. The mixture was neutralized with saturated sodium carbonate and the acetone removed under vacuum. The product was extracted with methylene chloride, chromatographed over a column of Florisil and eluted therefrom with solvent fractions containing acetone in Skellysolve B. Recrystallization from acetone yielded light-colored crystals of pure 11β-hydroxy-4,14-pregnadiene-3,20-dione (VI).

EXAMPLE 3A

11α-hydroxy-4,14-pregnadiene-3,20-dione 14-dehydro-11α-hydroxyprogesterone) (VI)

Following the procedure of Example 3, but employing 11α-hydroxy-4,14-pregnadiene-3,20-dione 3,20-bis-(ethylene ketal) (V) as starting material, yields 11α-hydroxy-4,14-pregnadiene-3,20-dione (VI), a light-colored crystalline solid.

Example 3B

*11α-hydroxy-4,14-pregnadiene-3,20-dione (VI)*

A solution of 0.2 g. of chromium trioxide in 10 ml. of acetic acid, 1.5 ml. of water and 0.02 ml. of concentrated sulfuric acid was added dropwise to a solution of 0.3 g. of 11β-hydroxy-4,14-pregnadiene-3,20-dione (VI) in 10 ml. of acetic acid and 1 ml. of water at a temperature of about 5° C. The resulting solution was poured into a mixture of about 100 ml. of ice and water. The mixture was extracted with methylene chloride, the extract washed with water until the washings were neutral and then dried over anhydrous sodium sulfate. Concentration of the dried methylene chloride solution gave an oily residue which was crystallized from ether to yield light-colored crystalline 4,14-pregnadiene-3,11,20-trione (X). A solution containing 0.2 g. of this product, 5 ml. of ethylene glycol and 0.2 g. of p-toluene-sulfonic acid in 100 ml. of benzene was refluxed for a period of about 18 hours. The water initially present and formed during the reaction was continuously removed with a Dean-Stark separator. The cooled solution was washed with dilute aqueous sodium carbonate, dried over magnesium sulfate and evaporated to dryness under vacuum. The residue was crystallized from hexane to yield light-colored crystals of 4,14-pregnadiene-3,11,20-trione 3,20-bis(ethylene ketal) (IV). To a solution of 0.1 g. of this product in 10 ml. of n-propanol, 1 g. of sodium was added. After the sodium was dissolved, the reaction mixture was diluted with water and extracted with methylene chloride. The methylene chloride was evaporated under vacuum; the oily residue remaining was dissolved in 5 ml. of methanol, 3 ml. of acetone and 1 ml. of 5 N hydrochloric acid and heated at refluxing temperature for a period of about 1 hour. The solution was cooled, diluted with water and extracted with methylene chloride; the extracts were washed with water until the washings were neutral. The methylene chloride extracts were concentrated to a semicrystalline residue which was dissolved in a mixture of ether and hexane, from which light-colored crystals of 11α-hydroxy-4,14-pregnadiene-3,20-dione (VI) was obtained.

Example 4

*15 - methyl - 4,14 - pregnadiene - 3,11,20 - trione 3,20-(bis(ethylene ketal) (14-dehydro-15-methyl-11-ketoprogesterone 3,20-bis[ethylene ketal]) (IX)*

A solution of 1 g. of 15α-methyl-15β-hydroxy-11-ketoprogesterone 3,20-bis(ethylene ketal) (VIII) in 10 ml. of pyridine was cooled to a temperature of about 0° C. 0.8 ml. of thionyl chloride was added dropwise to the solution with stirring; following about ten minutes of stirring, the mixture was poured over ice and the crystalline product (0.85 g.) separated therefrom by filtration. Recrystallization of this material yielded 0.75 g. of 15-methyl-4,14-pregnadiene-3,11,20-trione 3,20-bis-(ethylene ketal) (IX) with a melting point of 133 to 134° C.

*Analysis.*—Calcd. for $C_{26}H_{36}O_5$: C, 72.86; H, 8.48. Found: C, 73.17; H, 8.68.

$\gamma_{max}^{Nujol}$ 1701, 1675, 1658, 1150, 1035 cm.$^{-1}$

Example 5

*15-methyl-4,14-pregnadiene-3,11,20-trione (14-dehydro-15-methyl-11-ketoprogesterone) (X)*

A solution of 11.39 g. of 15-methyl-4,14-pregnadiene-3,11,20-trione 3,20-bis(ethylene ketal) (IX) in 250 ml. of acetone was diluted with 25 ml. of water containing 25 drops of concentrated sulfuric acid. After standing at about 22 to 25° C. for a period of about 15 hours, the mixture was neutralized with saturated sodium bicarbonate solution and the acetone removed under vacuum. The product was extracted with methylene chloride, chromatographed over 1 kg. of Florisil and eluted with portions of 10 and 15% of acetone in Skellysolve B. 5.94 g. of product was recovered on elution with the 15% acetone-Skellysolve B fractions. A sample of this material was crystallized and melted at 128 to 134° C.; its infrared spectrum was identical to that of 15-methyl-4,14-pregnadiene-3,11,20-trione (X) prepared by the N-bromoacetamide-sulfur dioxide-pyridine dehydration of 15α-methyl-15β-hydroxy-4-pregnene-3,11,20-trione.

Example 6

*15-methyl-11β-hydroxy-4,14-pregnadiene-3,20-dione 3,20-bis(ethylene ketal) (15 - methyl-14-dehydro-11β-hydroxyprogesterone 3,20-bis (ethylene ketal) and 15-methyl - 11α - hydroxy - 4,14-pregnadiene-3,20-dione 3,20 - bis(ethylene ketal) (15-methyl-14-dehydro-11α-hydroxyprogesterone 3,20-bis(ethylene ketal) (IXa)*

Following the procedure of Example 2, but employing 15-methyl-4,14-pregnadiene-3,11,20-trione 3,20-bis(ethylene ketal) (IX) as starting material, yields 15-methyl-11β - hydroxy - 4,14 - pregnadiene-3,20-dione-3,20-bis-(ethylene ketal) (IXa)

Example 7

*15 - methyl - 11β-hydroxy-4,14-pregnadiene-3,20-dione (14-dehydro-15-methyl-11β-hydroxyprogesterone) (VI)*

Following the procedure of Example 3, but substituting 15-methyl-11β-hydroxy-4,14-pregnadiene-3,20-dione 3,20-bis(ethylene ketal) (IXa) as starting material, yields 15-methyl-11β-hydroxy-4,14-pregnadiene-3,20-dione (XI).

Example 7A

*15-methyl-11α-hydroxy-4,14-pregnadiene-3,20-dione (14-dehydro-15-methyl-11α-hydroxy-progesterone) (VI)*

Following the procedure of Example 3, but employing 15-methyl-11α-hydroxy-4,14-pregnadiene-3,20-dione 3,20-bis(ethylene ketal) (IXa) as starting material, yields 15-methyl-11α-hydroxy-4,14-pregnadiene-3,20-dione (VI).

Example 7B

*15-methyl-11α-hydroxy-4,14-pregnadiene-3,20-dione (VI)*

Following the procedure of Example 3B, but substituting 15-methyl-11β-hydroxy-4,14-pregnadiene-3,20-dione (VI) as starting material, is productive of 15-methyl-11α-hydroxy-4,14-pregnadiene-3,20-dione (VI).

Example 8

*15β-hydroxy-4-pregnene-3,11,20-trione 3,20-bis(ethylene ketal), 15 - methyl carbonate (15β - hydroxy-11-ketoprogesterone 3,20-bis[ethylene ketal], 15-methyl carbonate) (XII)*

A mixture of 7 g. of 15β-hydroxy-11-ketoprogesterone 3,20-bis(ethylene ketal) (XI) (Preparation 4), 130 ml. of dimethyl carbonate and 240 ml. of benzene was distilled under nitrogen until 25 ml. of distillate was removed. 8 g. of a 52% mineral oil suspension of sodium hydride was added to the mixture, which was then heated at refluxing temperature for a period of about 15 hours. The mixture was then cooled, filtered through Celite (diatomaceous earth) and the filtrate distilled under vacuum to remove the solvent. The residue was dissolved in hot methanol and filtered; 4.08 g. of product crystallized from the filtrate on cooling. A sample of this material was recrystallized from methanol and yielded pure 15β-hydroxy - 4 - pregnene-3,11,20-trione 3,20-bis(ethylene ketal) 15-methyl carbonate (XII) melting at 199 to 201° C.

*Analysis.*—Calcd. for $C_{27}H_{38}O_8$: C, 66.10; H, 7.81. Found: C, 66.35; H, 7.94.

$\gamma_{max}^{Nujol}$ 1738, 1706, 1688 cm.$^{-1}$

The structure expected for this compound was confirmed by its nuclear magnetic resonance spectrum.

Example 9

4,15-pregnadiene-3,11,20-trione 3,20-bis(ethylene ketal) (15 - dehydro - 11-ketoprogesterone 3,20-bis[ethylene ketal]) (XIII)

2 g. of 15β-hydroxy-4-pregnene-3,11,20-trione 3,20-bis(ethylene ketal), 15-methyl carbonate (XII) was heated under vacuum in a Wood's metal bath with magnetic stirring. The flask was placed in the bath at an initial temperature of 300° C. and over a period of about 10 minutes the heat was increased until it reached 350° C.; by this time the bubbling in the reaction flask had nearly ceased and a crystalline sublimate was present; on cooling, the contents of the flask crystallized. The infrared spectrum of this total crude material indicated that the absorption band due to the carbonate ester was lost. The crude residue was dissolved in boiling methanol containing one drop of pyridine and filtered. The product, weighing 1.03 g., crystallized from the solvent on cooling and melted at 195 to 200° C. Two further crystallizations from methanol yielded an analytical sample of 4,15-pregnadiene-3,11,20-trione 3,20-bis(ethylene ketal) (XIII), melting at 205 to 207° C.

*Analysis.*—Calcd. for $C_{25}H_{34}O_5$: C, 72.43; H, 8.27. Found: C, 72.19; H, 8.42.

The nuclear magnetic resonance spectrum of this compound confirmed the $\Delta^{15}$ bond by a doublet of doublets centering at 351 c.p.s. downfield from tetramethylsilane at 60 megacycles.

Example 10

4,15 - pregnadiene-3,11,20-trione (15-dehydro-11-keto-progesterone) (XV)

To suspension of 20.7 g. of 4,15-pregnadiene-3,11,20-trione 3,20-bis(ethylene ketal) (XIII) in 500 ml. of acetone, 100 ml. of water containing 5 ml. of concentrated sulfuric acid was added. After stirring the mixture for a period of about 16 hours at room temperature (22 to 25° C.) the steroid dissolved. The mixture was then neutralized with saturated sodium bicarbonate solution and the solvent reduced under vacuum to a volume of 150 ml. The residue was partitioned between methylene chloride and water. The organic layer was separated and washed well with water and the solvent removed, leaving a residue. The residue was treated with acetone to give 7.2 g. of crystals melting at 198 to 204° C. Concentration of the mother-liquor yielded 2.2 g. of a second crop melting at 192 to 201° C. This material was dissolved in 15 ml. of methylene chloride and 50 ml. of acetone and the solution evaporated on a rotary evaporator without heating until crystallization occurred. The thus obtained 4,15-pregnadiene-3,11,20-trione (XV), had a melting point of 204 to 208° C.

*Analysis.*—Calcd. for $C_{21}H_{26}O_3$: C, 77.27; H, 803. Found: C, 77.14; H, 8.60.

$\gamma_{max}^{Nujol}$ 1710 cm.$^{-1}$ (sat. C=O), 1670 cm.$^{-1}$ (conj. C=O) 1615 cm.$^{-1}$ ($\Delta^4$ C=C)

Example 11

11β-hydroxy-4,15-pregnadiene-3,20-dione 3,20-bis(ethylene ketal) (15-dehydro-11β-hydroxyprogesterone 3,20-bis[ethylene ketal]) and 11α-hydroxy-4,15-pregnadiene-3,20-dione 3,20-bis(ethylene ketal) (15-dehydro-11α-hydroxyprogesterone 3,20-bis[ethylene ketal]) (XIIIa)

Following the procedure of Example 2, but substituting 4,15 - pregnadiene-3,11,20-trione-3,20-bis(ethylene ketal) (XIII) as starting material, yields 11β-hydroxy-4,15-pregnadiene-3,20-dione 3,20-bis(ethylene ketal) (XIIIa) and 11α-hydroxy-4,15-pregnadiene-3,11,20-trione 3,20-bis(ethylene ketal) (XIIIa).

Example 12

11β - hydroxy-4,15-pregnadiene-3,20-dione (15-dehydro-11β-hydroxyprogesterone) (XIV)

Following the procedure of Example 3, but substituting 11β-hydroxy-4,15-pregnadiene-3,20-dione 3,20-bis(ethylene ketal) (XIIIa) as starting material, yields 11β-hydroxy-4,15-pregnadiene (XIV).

Example 12A

11α-hydroxy-4,15-pregnadiene-3,20-dione (15-dehydro-11α-hydroxyprogesterone) (XIV)

Following the procedure of Example 3, but employing 11α-hydroxy-4,15-pregnadiene-3,20-dione, 3,20-bis(ethylene ketal) (XIIIa) as starting material, yields 11α-hydroxy-4,15-pregnadiene-3,20-dione (XIV).

Example 13

15 - methyl - 15β - hydroxy - 4 - pregnene - 3,11,20-trione 3,20-bis(ethylene ketal), 15-methyl carbonate ester (15β-hydroxy-11-ketoprogesterone 3,20-bis[ethylene ketal], 15-methylcarbonate ester) (XVI)

A mixture of 12 g. (28.4 millimoles) of 15α-methyl-15β-hydroxy-4-pregnene-3,11,20-trione 3,20-bis(ethylene ketal) (VIII) (Preparation 5), 240 ml. of dimethyl carbonate and 430 ml. of benzene was placed in a flask equipped with a Dean-Stark water trap. The mixture was stirred and heated at refluxing temperature on a steam bath for about 15 minutes. The flask was provided with a nitrogen atmosphere, 14 g. of a 52% dispersion of sodium hydride in mineral oil was added cautiously and the reaction mixture stirred while heating at refluxing temperatures for a period of about 24 hours. The reaction mixture was filtered through a Celite pad; the residual sodium hydride was carefully decomposed with tertiary butyl alcohol. The filtrate was concentrated by vacuum distillation with heat generated by a hot water bath kept at 60° C. to yield a gummy crystalline mass. The total crude product was dissolved in 500 ml. of methylene chloride and chromatographed over 800 g. of Florisil. The first four 500 ml. fractions of 10% acetone in Skellysolve B removed mineral oil and traces of less polar impurities; the product was eluted in fractions 6 to 9, inclusive, with 15% acetone in Skellysolve B and on recrystallization from methanol yielded 11.2 g. (22.2 millimoles or 78.3% of theoretical) of pure 15α-methyl-15β-hydroxy-4-pregnene-3,11,20-trione 3,20-bis(ethylene ketal), 15-methylcarbonate ester (XVI) with a melting point of 164 to 166° C. and a rotation $[\alpha]_D$ of +12° (chloroform).

*Analysis.*—Calcd. for $C_{28}H_{40}O_8$: C, 66.70; H, 8.0. Found: C, 66.79; H, 8.07.

Example 14

15-methyl-4,15-pregnadiene-3,11,20-trione 3,20-bis(ethylene ketal) (15-dehydro-15-methyl-11-ketoprogesterone 3,20-bis [ethylene ketal]) (XVII)

A 200 ml. flask containing 10 g. of 15α-methyl-15β-hydroxy - 4 - pregnene - 3,11,20 - trione 3,20 - bis(ethylene ketal), 15-methylcarbonate ester (XVI) was evacuated and then placed in a Wood's metal bath having a temperature of about 230° C. The steroidal material was heated with stirring for about 5 minutes while the bath temperature rose to 260° C. and the molten mass bubbled vigorously as the carbonate ester was pyrolyzed. The flask was removed from the bath, cooled and the glassy contents dissolved in 100 ml. of methanol; crystallization occurred almost immediately following solution. After cooling, the mixture was filtered and gave 7.48 g. of crystalline 15-methyl-4,15-pregnadiene-3,11,20-trione 3,20-bis-(ethylene ketal) (XVII) with a melting point of 127 to 133° C. and a rotation $[\alpha]_D$ of +42° (chloroform).

*Analysis.*—Calcd. for $C_{26}H_{36}O_5$: C, 72.86; H, 8.47. Found: C, 72.66; H, 8.44.

EXAMPLE 15

*15 - methyl - 11β - hydroxy - 4,15 - pregnadiene - 3,20-dione 3,20-bis(ethylene ketal) (15-methyl-15-dehydro-11β-hydroxyprogesterone 3,20-bis[ethylene ketal]) and 15 - methyl - 11α - hydroxy - 4,15 - pregnadiene - 3,20-dione 3,20-bis(ethylene ketal) (15-methyl-15-dehydro-11α - hydroxyprogesterone 3,20 - bis[ethylene ketal]) (XIIIa)*

Following the procedure of Example 2, but employing 15-methyl-4,15-pregnadiene-3,11,20-trione 3,20-bis(ethylene ketal) (XVII) as starting material, yields 15-methyl-11β - hydroxy - 4,15 - pregnadiene - 3,20 - bis(ethylene ketal) (XIIIa) and 15-methyl-11α-hydroxy-4,15-pregnadiene-3,20-dione 3,20-bis(ethylene ketal) (XIIIa).

EXAMPLE 16

*15-methyl-11β-hydroxy-4,15-pregnadiene-3,20-dione (15-dehydro-15-methyl-11β-hydroxyprogesterone) (XIV)*

Following the procedure of Example 3, but substituting 15 - methyl - 11β - hydroxy - 4,15 - pregnadiene - 3,20-dione 3,20-bis(ethylene ketal) (XIIIa) as starting material, yields 15-methyl-11β-hydroxy-4,15-pregnadiene-3,20-dione (XIV).

EXAMPLE 16A

*15 - methyl - 11α - hydroxy - 4,15 - pregnadiene - 3,20-dione (15-dehydro-15-methyl-11α-hydroxyprogesterone) (XIV)*

Following the procedure of Example 3, but employing 15 - methyl - 11α - hydroxy - 4,15 - pregnadiene - 3,20-dione 3,20-bis(ethylene ketal) (XIIIa) as starting material, yields 15-methyl-11α-hydroxy-4,15-pregnadiene-3,20-dione (XIV).

EXAMPLE 16B

*15-methyl-11α-hydroxy-4,15-pregnadiene-3,20 dione (XIV)*

Following the procedure of Example 3B, but substituting 15 - methyl - 11β - hydroxy - 4,15 - pregnadiene-3,20-dione (XIV) as starting material, is productive of 15-methyl-11α-hydroxy-4,15-pregnadiene-3,20-dione (XIV).

EXAMPLE 17

*15-methyl-4,15-pregnadiene-3,11,20-trione (15-methyl-15-dehydro-11-ketoprogesterone) (XV)*

Following the procedure of Example 5, but substituting 15-methyl-4,15-pregnadiene-3,11,20-trione 3,20-bis(ethylene ketal) (XVII) (Example 14) as starting material, yields 15-methyl-4,15-pregnadiene-3,11,20-trione (XV).

EXAMPLE 18

(a) *4.14-pregnadiene-3,11,20-trione (14-dehydro-11-ketoprogesterone) (X)*
(b) *4-pregnene-3,11,20-trione 15α-p-toluenesulfonate (11-ketoprogesterone 15α-p-toluenesulfonate)*
(c) *15β-chloro-4-pregnene-3,11,20-trione (15β-chloro-11-ketoprogesterone) (II)*

A mixture of 1 g. of 15α-hydroxy-11-ketoprogesterone (I) (Preparation 1), 0.75 g. of p-toluenesulfonyl chloride and 3 ml. of pyridine was heated at 60 to 70° C. with stirring for a period of about 5 hours. The mixture was poured into water, extracted with methylene chloride and the extracts washed successively with dilute acid, saturated sodium bicarbonate solution and water. The product was chromatographed over a column of 100 g. of Florisil and eluted with (1) 10% acetone in Skellysolve B, (2) 15% acetone in Skellysolve B and (3) acetone.

(a) The 15% eluates contained 0.118 g. of a crystalline product, identified as 4,14-pregnadiene-3,11,20-trione (X) by its infrared spectrum. Recrystallization of this material from a mixture of acetone and Skellysolve B yielded 0.5 g. of crystals with a melting point of 180 to 186° C.

(b) The above acetone fraction contained 1.02 g. of oils and was rechromatographed over a column of 100 g. of Florisil and eluted with mixtures of 15% and 20% acetone in Skellysolve B. The 15% acetone-Skellysolve B eluates contained 0.356 g. of an oil whose infrared spectrum exhibited characteristic tosyl ester absorption. "Stripping" the Florisil column with acetone yielded 0.149 g. of crude crystalline starting material, 15α-hydroxy-11-ketoprogesterone (I), identified by its infrared spectrum.

(c) The 20% acetone-Skellysolve B eluates from (b), above, contained 0.43 g. of a crystalline compound whose infrared spectrum was very similar to that of 11-ketoprogesterone and gave a strong Beilstein test. Recrystallization of this fraction from acetone-Skellysolve B yielded 0.12 g. of crystalline 15β-chloro-4-pregnene-3,11,20-trione (II), with a melting point of 175 to 178° C. (decomposition) and a positive Beilstein test for halogen.

*Analysis.*—Calcd. for $C_{21}H_{27}ClO_3$: C, 69.50; H, 7.50; Cl, 9.77. Found: C, 69.72; H, 7.72; Cl, 9.01.

$\gamma_{max.}^{Nujol}$ 1698, 1658, 1614 cm.$^{-1}$

EXAMPLE 19

*4-pregnene-3,11,20-trione 15α-p-toluenesulfonate (11-ketoprogesterone 15α-p-toluenesulfonate)*

A mixture of 5 g. (0.0145 mole) of 15α-hydroxy-11-ketoprogesterone (I), 35 ml. of pyridine and 4 g. (0.021 mole) of p-toluenesulfonyl chloride was stirred at 25° C. for 7 days. After evaporation of the pyridine, the residual dark amber oil was chromatographed on a column of Florisil; elution with a mixture comprising 80% of petroleum ether and 20% of acetone gave 3.5 g. (48% yield) of the desired product. Two recrystallizations from acetone-petroleum ether gave an analytical sample of 4-pregnene-3,11,20-trione 15α-p-toluenesulfonate, having a melting point of 157 to 157.5° C.

*Analysis.*—Calcd. for $C_{28}H_{34}O_6S$: C, 67.44; H, 6.87; S, 6.43. Found: C, 67.44; H, 6.83; S, 6.43.

$\lambda_{max.}^{C_2H_5OH}$ 227 and 272 mμ, ε=24,950 and 24,867

EXAMPLE 20

*15-bromo-4-pregnene-3,11,20-trione (15-bromo-11-ketoprogesterone) (II)*

1 g. of N-bromoacetamide was added to a solution of 2 g. of 15α-hydroxy-11-ketoprogesterone (I) (Preparation 1) in 10 ml. of pyridine. The mixture was stirred for a period of about 10 minutes, cooled in an ice-bath, gaseous sulfur dioxide blown over its surface until no color change occurred, and then poured onto ice. The oil that separated was extracted with methylene chloride, washed with dilute hydrochloric acid and then with a saturated solution of sodium bicarbonate. The extract was filtered and the solvent evaporated under vacuum. The residue was recrystallized twice from a mixture of acetone and Skellysolve B to yield 1 g. of crystals of pure 15-bromo-4-pregnene-3,11,20-trione (II) melting at 133 to 140° C. with decomposition. A second crop of 0.22 g. with an infrared spectrum identical to that of the main crop was obtained.

*Analysis.*—Calcd. for $C_{21}H_{27}O_3Br$: C, 61.91; H, 6.68; Br, 19.62. Found: C, 62.27; H, 7.37; Br, 19.16. $[\alpha]_D + 89°$ (acetone);

$\lambda_{max.}^{C_2H_5OH}$ 236.5 mμ, ε=14,900

The infrared spectrum was similar to that of 11-ketoprogesterone and nearly identical with that reported above in Example 18(c) for 15β-chloro-4-pregnene-3,11,20-trione (II).

EXAMPLE 21

*4,14-pregnadiene-3,11,20-trione (14-dehydro-11-ketoprogesterone) (X)*

A crude preparation (melting point 126 to 134° C.) of 1.8 g. of 15-bromo-4-pregnene-3,11,20-trione (II) (prepared as in Example 20) was heated at refluxing temperature with 5 ml. of collidine for a period of about 5 minutes. After about one minute of heating a solid precipitated from the reaction mixture. The mixture was cooled, dissolved in methylene chloride, first washed with dilute hydrochloric acid and then with saturated sodium bicarbonate solution. The methylene chloride solution was evaporated under vacuum, leaving a crystalline residue. The infrared spectrum of this residue was found to be identical to that of 4,14-pregnadiene-3,11,20-trione (X).

Following the procedure of Example 21, but substituting 15-chloro-4-pregnene-3,11,20-trione (II) as starting material is also productive of 4,14-pregnadiene-3,11,20-trione (X).

EXAMPLE 22

*15-methylene-4-pregnene-3,11,20-trione 3,20-bis(ethylene ketal) (15 - methylene - 11 - ketoprogesterone 3,20-bis-[ethylene ketal]) (VII')*

A mixture of 24 g. of methyl triphenylphosphonium bromide and 260 ml. of benzene was distilled until the distillate was clear, after which the mixture was heated at refluxing temperature. 50 ml. of absolute ether was added thereto and then a suspension of 15 ml. of 26% n-butyl lithium in heptane added and the mixture heated at refluxing temperature for a period of about 90 minutes. A solution of 5 g. of 4-pregnene-3,11,15,20-tetraone 3,20-bis(ethylene ketal) (VII) (synthesized as in Preparation 3) in 100 ml. of benzene was distilled sufficiently to remove the water contained therein, then added to the above-prepared reagent and heating of the mixture continued at refluxing temperature for a period of about 3 hours. The reaction mixture was cooled, diluted with water and the organic layer separated and washed successively with dilute hydrochloric acid, water, saturated sodium bicarbonate solution, again with water and the solvent removed to yield a crystalline residue. This material was recrystallized from methanol to give 2.3 g. of product melting at 155 to 165° C. Purification of this product by chromatographing on a column of Florisil and elution therefrom with 3% acetone in Skellysolve B, yielded 15-methylene-4-pregnene-3,11,20-trione 3,20-bis-(ethylene ketal) (VII') with a melting point of 175 to 179° C. following crystallization from acetone-hexanes. Further chromatography with 10% acetone and Skellysolve B yielded the 3-monoethylene ketal of 15-methylene-4-pregnene-3,11,20-trione (2.6 g.) melting at 173–180° C. A sample recrystallized from methanol melted at 173–178° C.

*Analysis.*—Calcd. for $C_{24}H_{32}O_4$: C, 74.97; H, 8.39. Found: C, 74.32; H, 8.46. $[\alpha]_D$ (acetone) —110°.

EXAMPLE 23

*15-methylene-4-pregnene-3,11,20-trione (15-methylene-11-ketoprogesterone) (VII'A)*

Following the procedure of Example 1A, but substituting 15-methylene-4-pregnene-3,11,20-trione 3,20-bis(ethylene ketal) (VII') as starting compound, or the monoketal, above, there is thus produced 15-methylene-4-pregnene-3,11,20-trione (VII'A).

EXAMPLE 24

*15-methylene-11β-hydroxy-4-pregnene - 3,20 - dione 3,20-bis(ethylene ketal) (15-methylene-11β-hydroxyprogesterone 3,20-bis[ethylene ketal]) and 15-methylene-11α-hydroxy-4-pregnene-3,20-dione 3,20-bis(ethylene ketal) (15-methylene-11α-hydroxyprogesterone 3,20-bis[ethylene ketal]) (VII'B)*

Following the procedure of Example 2, but substituting 15-methylene-4-pregnene-3,11,20-trione 3,20-bis(ethylene ketal) (VII') as starting compound, there is thus produced 15-methylene-11β-hydroxy-4-pregnene-3,20-dione 3,20-bis(ethylene ketal) (VII'B) and 15-methylene-11α-hydroxy-4-pregnene-3,20-dione 3,20-bis(ethylene ketal) (VII'B).

EXAMPLE 25

*15 - methylene - 11β - hydroxy - 4 - pregnene - 3,20 - dione (15-methylene-11β-hydroxyprogesterone) (VII'C)*

Following the procedure of Example 3, but substituting 15-methylene-11β-hydroxy-4-pregnene-3,20-dione 3,20-bis(ethylene ketal) (VII'B) as starting compound, there is thus produced 15-methylene-11β-hydroxy-4-pregnene-3,20-dione (VII'C).

EXAMPLE 26

*15-methylene-11α-hydroxy-4-pregnene-3,20-dione (15-methylene-11α-hydroxyprogesterone) (VII'C)*

Following the procedure of Example 3A but substituting 15-methylene-11α-hydroxy-4-pregnene-3,20-dione 3,20-bis(ethylene ketal) (VII'B) as starting compound, there is thus produced 15-methylene-11α-hydroxy-4-pregnene-3,20-dione (VII'C).

EXAMPLE 27

*15-methylene-11α-hydroxy-4-pregnene-3,20-dione (15-methylene-11α-hydroxyprogesterone) (VII'C)*

Following the procedure of Example 3B, but substituting 15 - methylene - 11β - hydroxy - 4 - pregnene - 3,20-dione (VII'C) as starting compound, there is thus produced 15-methylene-11α-hydroxy-4-pregnene-3,20-dione (VII'C).

We claim:

1. Compounds of the formula

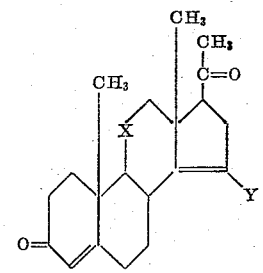

wherein X is selected from the group consisting of the β-hydroxymethylene radical

the α-hydroxymethylene radical

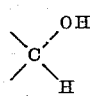

and the carbonyl radical, $>C=O$, Y is selected from the group consisting of hydrogen and methyl, and the 3,20-bis(alkylene ketals) thereof wherein the alkylene ketal radicals are of the formula

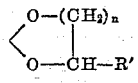

wherein $n$ is selected from the integers one and two and R' is selected from the group consisting of hydrogen and a lower-alkyl radical containing from one to six carbon atoms, inclusive.

2. 11β-hydroxy-4,14-pregnadiene-3,20-dione.
3. 11α-hydroxy-4,14-pregnadiene-3,20-dione.
4. 4,14-pregnadiene-3,11,20-trione.
5. 15-methyl-11β-hydroxy-4,14-pregnadiene-3,20-dione.
6. 15-methyl-11α-hydroxy-4,14-pregnadiene-3,20-dione.
7. 15-methyl-4,14-pregnadiene-3,11,20-trione.

8. Compounds of the formula

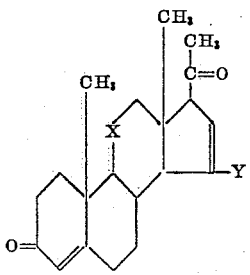

wherein X is selected from the group consisting of the β-hydroxymethylene radical

the α-hydroxymethylene radical

and the carbonyl radical, >C=O, Y is selected from the group consisting of hydrogen and methyl, and the 3,20-bis(alkylene ketals) thereof wherein the alkylene ketal radicals are of the formula

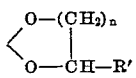

wherein n is selected from the integers one and two and R' is selected from the group consisting of hydrogen and a lower-alkyl radical containing from one to six carbon atoms, inclusive.

9. 11β-hydroxy-4,15-pregnadiene-3,20-dione.
10. 11α-hydroxy-4,15-pregnadiene-3,20-dione.
11. 4,15-pregnadiene-3,11,20-trione.
12. 15 - methyl - 11β - hydroxy - 4,15 - pregnadiene-3,20-dione.
13. 15 - methyl - 11α - hydroxy - 4,15 - pregnadiene-3,20-dione.
14. 15-methyl-4,15-pregnadiene-3,11,20-trione.
15. Compounds of the formula

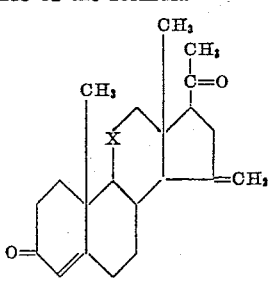

wherein X is selected from the group consisting of the β-hydroxymethylene radical

the α-hydroxymethylene radical

and the carbonyl radical, >C=O, and the 3,20-bis(alkylene ketals) thereof wherein the alkylene ketal radicals are of the formula

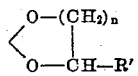

wherein n is selected from the integers one and two and R' is selected from the group consisting of hydrogen and a lower-alkyl radical containing from one to six carbon atoms, inclusive.

16. 15-methylene-11β-hydroxy-4-pregnene-3,20-dione.
17. 15-methylene-11α-hydroxy-4-pregnene-3,20-dione.
18. 15-methylene-4-pregnene-3,11,20-trione.
19. A process for the production of a compound of the formula

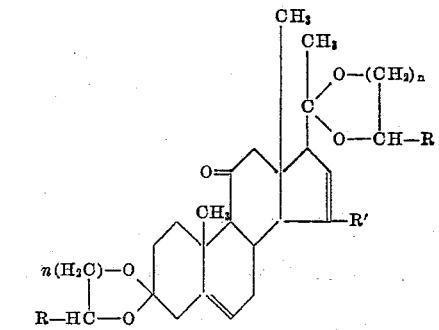

wherein n is an integer selected from the integers one and two, R is selected from the group consisting of hydrogen and a lower alkyl radical containing from one to six carbon atoms, inclusive, R' is selected from the group consisting of hydrogen and a lower alkyl radical containing from one to six carbon atoms, inclusive, which comprises pyrolyzing a compound of the formula

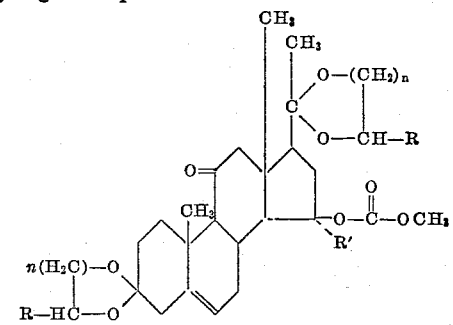

wherein n, R and R' have the same meanings as above.

20. A process for the production of 15-methyl-4,15(16)-pregnadiene-3,11,20-trione 3,20-bis(ethylene ketal) of the formula

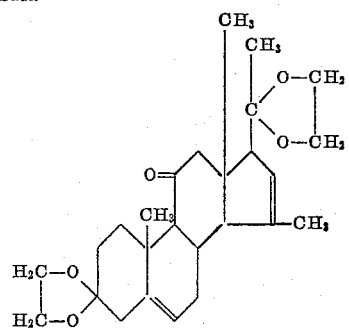

which comprises pyrolyzing 15α-methyl-15β-hydroxy-4-pregnene-3,11,20-trione 3,20-bis(ethylene ketal), 15-methylcarbonate ester of the formula

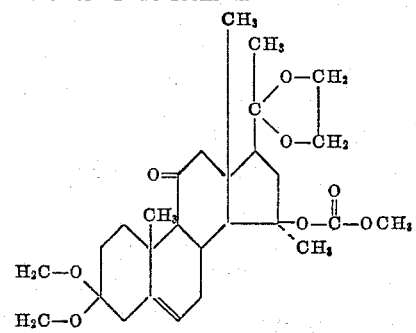

21. A process for the production of 4,15(16)-pregnadiene-3,11,20-trione 3,20-bis(ethylene ketal) of the formula
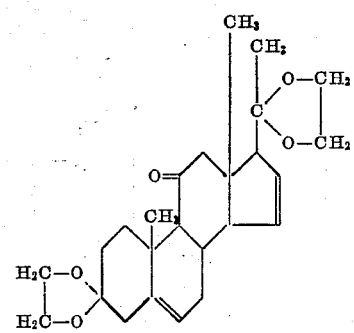
which comprises pyrolyzing 15β-hydroxy-4-pregnene-3, 11,20-trione 3,20-bis(ethylene ketal), 15-methylcarbonate ester of the formula
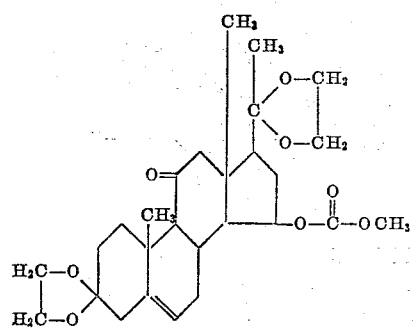
No references cited.